(12) United States Patent
Jagger et al.

(10) Patent No.: US 7,257,773 B1
(45) Date of Patent: Aug. 14, 2007

(54) METHOD AND SYSTEM FOR IDENTIFYING UNSOLICITED MAIL UTILIZING CHECKSUMS

(75) Inventors: Luke David Jagger, Bucks (GB); Anton Christian Rothwell, Bucks (GB); William R. Dennis, Buckinghamshire (GB)

(73) Assignee: McAfee, Inc., Santa Clara, CA (US)

( * ) Notice: Subject to any disclaimer, the term of this patent is extended or adjusted under 35 U.S.C. 154(b) by 1058 days.

(21) Appl. No.: 10/075,722

(22) Filed: Feb. 14, 2002

(51) Int. Cl.
*G06F 17/00* (2006.01)

(52) U.S. Cl. .................. 715/531; 709/206; 382/187
(58) Field of Classification Search ............ 715/531, 715/863, 500; 709/207, 206; 382/187
See application file for complete search history.

(56) References Cited

U.S. PATENT DOCUMENTS

| | | | |
|---|---|---|---|
| 5,796,406 A * | 8/1998 | Shigematsu et al. ........ | 715/863 |
| 5,796,866 A * | 8/1998 | Sakurai et al. .............. | 382/187 |
| 5,870,549 A | 2/1999 | Bobo, II ................ | 395/200.36 |
| 6,161,130 A | 12/2000 | Horvitz et al. ............. | 709/206 |
| 6,453,327 B1 * | 9/2002 | Nielsen ..................... | 715/500 |
| 6,459,442 B1 * | 10/2002 | Edwards et al. ............ | 715/863 |
| 6,493,007 B1 * | 12/2002 | Pang ......................... | 715/835 |
| 6,701,440 B1 * | 3/2004 | Kim et al. .................. | 713/201 |
| 6,829,635 B1 * | 12/2004 | Townshend .................. | 709/206 |
| 6,842,773 B1 * | 1/2005 | Ralston et al. ............. | 709/206 |
| 6,868,498 B1 * | 3/2005 | Katsikas .................... | 713/201 |

FOREIGN PATENT DOCUMENTS

WO 99/32985 7/1999

OTHER PUBLICATIONS

O'Brien et al., "Spam Filters: Bayes vs. Chi-squared; Letters vs. Words", Trinity College, Univ. of Dublin, 2002.*
Fawcett, "In vivo spam filtering: A challenge problem for KDD", SIGKDD Explorations, vol. 5, Issue 2, pp. 140-148., date unknown.*
Crandor et al., "An overview of spam blocking techniques", 1998 ACM.*
Fawcett, "In vivo spam filtering: A challenge problem for KDD", SIGKDD Explorations, vol. 5, Issue 2, pp. 140-148., Dec. 2003.*
RFC 1321 "The MD5 Message-Digest Algorithm" MIT Laboratory for Computer Science and RSA Data Security, Inc., Apr. 1992.

* cited by examiner

*Primary Examiner*—Doug Hutton
*Assistant Examiner*—James H Blackwell
(74) *Attorney, Agent, or Firm*—Zilka-Kotab, PC; Christopher J. Hamaty

(57) ABSTRACT

A method for identifying unsolicited electronic mail messages in a computer network. The method includes receiving an electronic mail message and removing non-static data from the electronic mail message. A checksum is generated based on data remaining within the electronic mail message and compared with a database containing checksums for previously identified unsolicited messages. The method further includes identifying the electronic message as an unsolicited message if the generated checksum matches one of the database checksums.

15 Claims, 7 Drawing Sheets

```
From: "luke@eu.nai.com" <luke@eu.nai.com>
To: <a@b.com>
Subject:
Date: Wed, 16 Feb 2000 09:08:34 -0000
MIME-Version: 1.0
Content-Type: multipart/mixed;
        boundary="----=_NextPart_000_0031_01BF785D.67153D00"

This is a multi-part message in MIME format.

------=_NextPart_000_0031_01BF785D.67153D00
Content-Type: text/plain;
Content-Transfer-Encoding:

This email will self-destruct in 20 seconds unless you forward it !!!

QUICK!... Forward it!

------=_NextPart_000_0031_01BF785D.67153D00
Content-Type: application/x-zip-compressed;
        name="boom.zip"
Content-Transfer-Encoding: base64
Content-Disposition: attachment;
        filename="boom.zip"

UEsDBAoAAgAAACU8Zh4jS4psRgAAAEYAAAAJAAAARWljYXIuY29tWDVPIVA1QEFQWzRcUFpYNTQo
UF4pN0NDKTd9JBVJQ0FSLVNUQU5EQVJELUFOVElWSVJVy1URVNULUZJTEUhJEgrSCoNC1BLAQIy
CwoAAgAAACU8Zh4jS4psRgAAAEYAAAAJAAAAAAAAAAEAIAD/gQAAAABFaWNhci5jb21QSwUGAAAA
AAEAAQA3AAAAbQAAAAAA ------=_NextPart_000_0031_01BF785D.67153D00-
```

FIG. 3

```
This email will self-destruct in 20 seconds unless you forward it !!!
QUICK!... Forward it!
```

FIG. 4

```
From: "luke@eu.nai.com" <luke@eu.nai.com>
To: <a@b.com>
Subject:
Date: Wed, 16 Feb 2000 09:08:34 -0000
MIME-Version: 1.0
Content-Type: text/plain This email will self-destruct in 20 seconds unless you forward it !!!

QUICK!... Forward it!
```

FIG. 5

```
This email will self-destruct in 20 seconds unless you forward it !!!

QUICK!... Forward it!
```

FIG. 6

METHOD AND SYSTEM FOR IDENTIFYING UNSOLICITED MAIL UTILIZING CHECKSUMS

BACKGROUND OF THE INVENTION

The present invention relates generally to electronic mail ("e-mail"), and more specifically, to a method and system for identifying unsolicited e-mail messages utilizing checksums.

Unsolicited bulk e-mail, commonly referred to as "SPAM", is increasingly becoming a nuisance to computer users. SPAM e-mail is generally defined as an unsolicited mailing, usually to a large number of people. SPAM can be very annoying to the recipient because it interrupts other activities, consumes system resources, and requires active efforts by recipients who want to dispose of these unwanted messages.

SPAM is also an increasing problem for Internet Service Providers (ISPs) and entities with easily identifiable e-mail addresses such as large corporations. ISPs object to junk mail because it reduces their users' satisfaction of the services. Corporations want to eliminate junk mail because it reduces worker productivity. SPAM impacts organizations by occupying employees' time and increasing security risks. Time is spent by employees to open each message, classify it as legitimate or junk e-mail, and delete the message. Time may also be spent by employees following up on advertising content while on the job. Employees may also be deceived into acting improperly, such as to release confidential information, due to a forged message. There is also a loss of the network administrator's time in dealing with SPAM and forged messages, as well as the use of network bandwidth, disk space, and system memory required to store the messages. Also, in the process of deleting junk mail, users may inadvertently discard or overlook other important messages. Another objection to SPAM is that it is frequently used to advertise objectionable, fraudulent, or dangerous content, such as pornography or to propagate financial scams such as illegal pyramid schemes.

SPAM such as chain letters or Hoax e-mails often cause network problems such as Denial of Service (DoS) to the mail server or gateway. Furthermore, after a user repeatedly becomes alarmed by these messages, only to learn that there was no real virus, the user may get into the habit of ignoring all virus warning messages. This leaves computer users especially vulnerable to the next real and truly destructive virus.

Conventional systems used to detect SPAM typically search for key phrases in the subject header to determine whether the recipient is actually on the list of users to receive e-mail. The person or organization that generates the junk mail (referred to as a "spammer") often gets around filtering methods by using a different e-mail address for each mailing or forwarding his e-mail by way of an intermediary to conceal the actual origin. Instead of mailing directly from an easily traced account at a major Internet service provider, spammers may, for instance, sent their e-mail from a SPAM-friendly network, using forged headers, and relay the message through intermediate hosts.

SUMMARY OF THE INVENTION

A method and system for identifying unsolicited electronic mail messages in a computer network are disclosed.

A method generally comprises receiving an electronic mail message and removing non-static material from the message. A checksum is generated based on data remaining within the electronic mail message and the generated checksum is compared with a database containing checksums previously identified for unsolicited messages. The electronic message is identified as an unsolicited message if the generated checksum matches one of the database checksums.

Checksums may be generated individually for portions of the remaining data, such as lines of data. The generated checksums are preferably compared with the database starting with a line of data at the end of the message and working backwards through the data.

A system for identifying unsolicited electronic mail messages in a computer network generally comprises a message modifier operable to remove non-static material from the electronic mail message and a checksum generator operable to generate a checksum based on data remaining within the electronic mail message. The system further includes a database containing checksums previously identified for unsolicited messages and a detector operable to compare the generated checksum with the database and identify the electronic message as an unsolicited message if the generated checksum matches one of the database checksums.

In another aspect of the invention, a computer program product for identifying unsolicited electronic mail messages in a computer network generally comprises code that receives an electronic mail message, removes non-static material from the electronic mail message, and generates a checksum based on data remaining within the electronic mail message. The product further includes code that compares the generated checksum with a database containing checksums previously identified for unsolicited messages and identifies the electronic message as an unsolicited message if the generated checksum matches one of the database checksums. A computer readable medium is provided to store the computer codes.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

FIG. 3 is an example of a multi-part MIME version of an unsolicited e-mail.

FIG. 4 is the e-mail of FIG. 3 with non-static material removed.

FIG. 5 is an example of a single-part MIME version of an unsolicited e-mail.

FIG. 6 is the e-mail of FIG. 5 with non-static material removed.

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention provides a method and system for identifying unsolicited electronic mail ("e-mail") messages with the use of checksums. The unsolicited e-mail may be SPAM, such as pyramid sales, chain letters, or hoax e-mails, for example. A checksum provides a unique identifier for a given block of text, such as an Internet mail message, which can be used to identify a common unsolicited e-mail.

Figure 1:
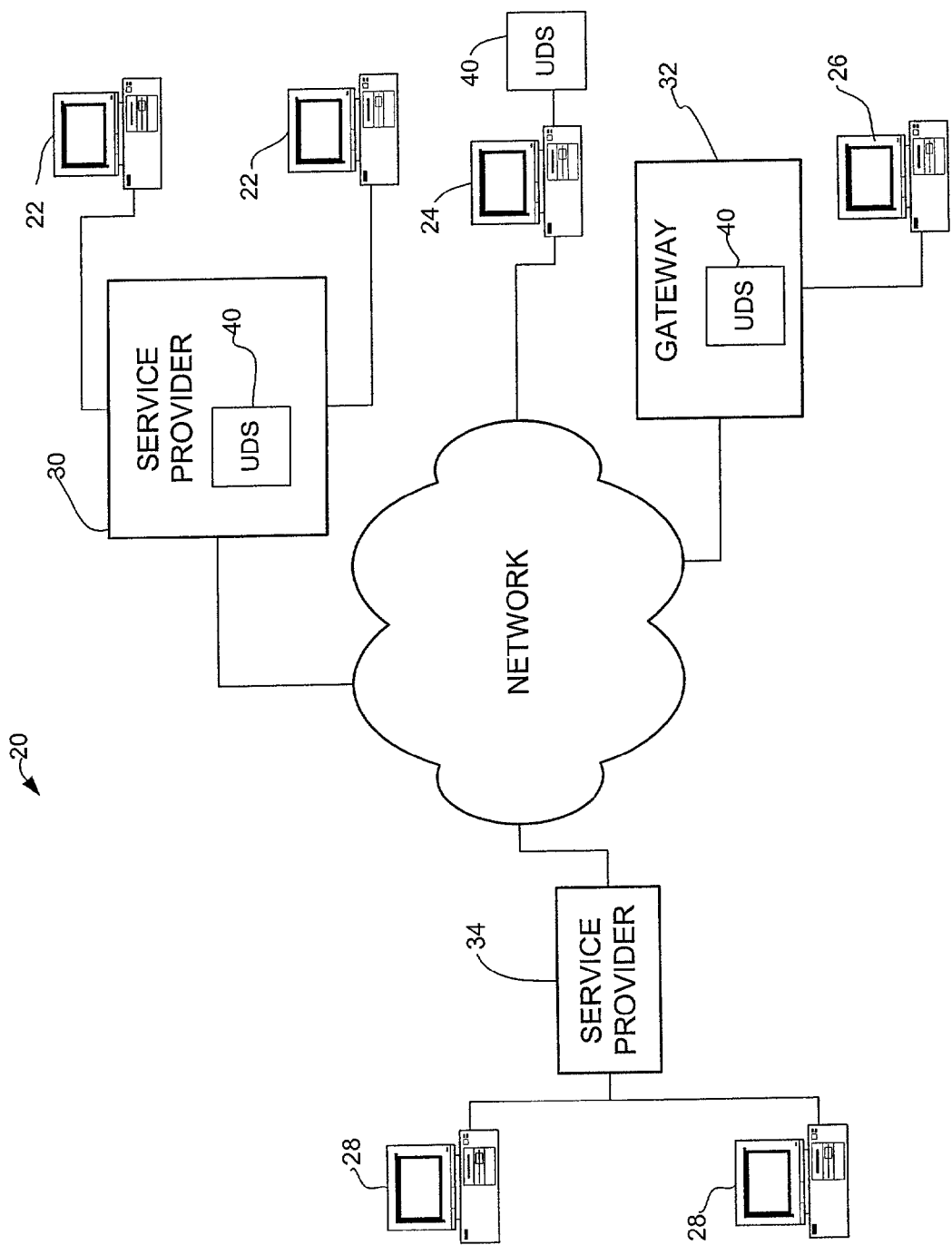
FIG. 1 is a diagram illustrating a network utilizing an unsolicited e-mail detection system and method of the present invention.

Referring now to the drawings, and first to FIG. 1, a system that may utilize the present invention is shown and generally indicated at 20. The system 20 includes user computers 22, 24, 26, 28 (described further below) in communication with one another through a network. User computers 22, 24, 26 may receive, for example, unsolicited e-mail from user computers 28 which are operated by spammers. User computers 22 receive e-mail through service provider 30 and user computer 26 receives e-mail through gateway 32. Computer 24 receives e-mail directly from the network. Unsolicited e-mail detection systems (UDS) 40 are installed within the network and configured to detect SPAM. Unsolicited e-mail detection system 40 is preferably installed at an Internet service provider, gateway, or proxy so that the unsolicited e-mail is blocked from entering the mail system. However, the system may also be installed at a user computer.

In the network shown in FIG. 1, service provider 30, gateway 32, and computer 24 each include unsolicited e-mail detection system 40. In the present example, user computers 28 are coupled to a service provider 34 and send unsolicited e-mail to user computers 22, 24, and 26. The connection between users and the network may include any suitable transmission media, including, but not limited to, public telephone lines, T1 lines, T3 lines, dial-up, DSL (Digital Subscriber Line), cable, Ethernet or wireless connections. The computers may be connected over a network such as the Internet, an intranet, a wide area network (WAN), local area network (LAN), or any other type of network. The computers may also be directly connected to one another or any number of other user computers. The computer may be a client computer coupled to an Internet service provider over a SLIP (Serial Line Interface Protocol) or PPP (Point to Point Protocol) connection. The Internet service provider is, in turn, coupled to the Internet, the client computer thereby having the ability to send and receive information to other nodes on the Internet using a TCP/IP protocol (Transmission Control Protocol/Internet Protocol).

It is to be understood that the network configuration and interconnections shown in FIG. 1 and described herein, are provided for purposes of illustration only. One of ordinary skill in the art will readily appreciate that the present invention may be practiced on networks more or less complex than that shown, in accordance with the teachings contained herein.

Figure 2:
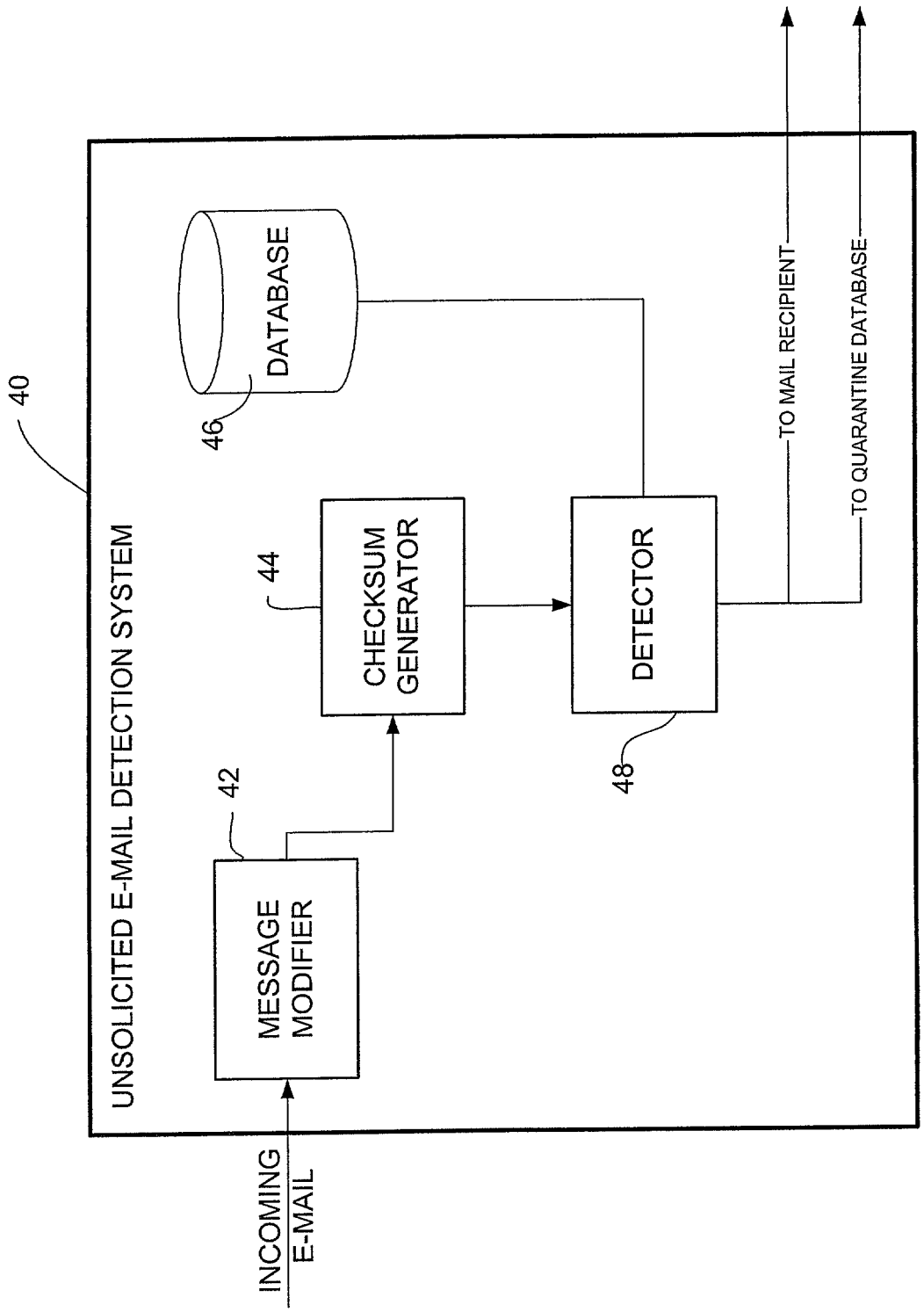
FIG. 2 is a block diagram illustrating the unsolicited e-mail detection system of FIG. 1.

FIG. 2 illustrates additional detail of the unsolicited e-mail detection system 40. The system 40 includes a message modifier 42, checksum generator 44, database 46, and detector 48. The database 46 contains checksums of previously identified unsolicited e-mails. The database 46 is distributed to computers having system 40 installed to aid in identification and removal of such messages passing therethrough. The database 46 is preferably updated over time. For example, a virus information library, such as MCAFEE's Virus Information Library, which contains useful information on virus hoaxes may be used to periodically update database 46.

Message modifier 42 is configured to remove all non-static material from incoming e-mail. Non-static areas includes, for example, some or all of the headers, forwarding information, end-of-line characters, and forwarding characters (such as the symbol '>' commonly used to denote a block containing the original message being forwarded). As used herein the term 'static' generally refers to data that remains constant in an e-mail regardless of how many times it is forwarded or if the originator or recipient of the e-mail changes. Static text may include, for example, any ASCII or non-ASCII characters including Unicode and any form of character encoding such as Quoted Printable, UTF7, UTF8, JIS, SJIS, or other character encoding. Static text may also include encoding schemes typically used for binary data encoding, but occasionally containing textual information, such as BASE64, BINHEX, UUEncoding or any other form of encoding or message encoding. The non-static material may also include a portion of the header such as a title. The non-static material may be text or any other type of data including characters or symbols.

An example of a multi-part MIME version of a 'self destruct' hoax e-mail is shown in FIG. 3. FIG. 4 shows the e-mail of FIG. 3 after the non-static material has been removed by the message modifier 42. The remaining static data includes the body of the message. FIG. 5 shows an example of a single-part MIME version of a 'self destruct' hoax e-mail and FIG. 6 shows the e-mail after the non-static material has been removed by the message modifier 42.

After the non-static material is removed, the checksum generator 44 generates a checksum based on the static portion of the e-mail that remains (FIGS. 4 and 6). The checksum is a computed value that depends on the contents of a block of data. The checksum provides a unique identifier for a given block of data, such as text of an Internet mail message, which can be used to identify a common unsolicited mail. The checksum is preferably dependent on the message from which it is generated and infeasible to generate from other messages. A checksum application such as MD5 (Message Digest number 5) may be used. (See, Request for Comments (RFC) 1321, the MD5 Message Digest Algorithm, R. Rivest, April 1992). It is to be understood that other checksum applications may be used without departing from the scope of the invention. After a checksum is generated the detector 48 is used to compare the generated checksum the database 46 checksums.

Much of the non-static data of an Internet mail message resides at the top of the e-mail. For example, this is where th message header is based, along with forwarding headers if the mail has been forwarded. The system 40 therefore preferably works backwards through the body of the e-mail message from the last line of the body text, generating a checksum at each new line. At each line, the latest checksum is checked against the database 46 to look for a match. If a match is found, no further processing is necessary. If no match is found the process continues, working upwards through the message until the top is reached or a match is identified. For example, in the messages shown in FIGS. 4 and 6, the detector begins at the last line of body text ("QUICK! . . . Forward it!"), creates a checksum based on this text, and compares it to checksums contained in database 46. If no match is found, a checksum is generated for the above line ("This email will self-destruct in 20 seconds unless you forward it!!!") and compares it to database 46.

If the detector 48 determines that the e-mail is unsolicited, the message is sent to a mail forwarder which forwards the e-mail to the intended e-mail recipient. If the e-mail is identified as an unsolicited message it is sent to a predetermined location or deleted. The predetermined location may be, for example, a quarantine database or other file or folder.

Figure 7:
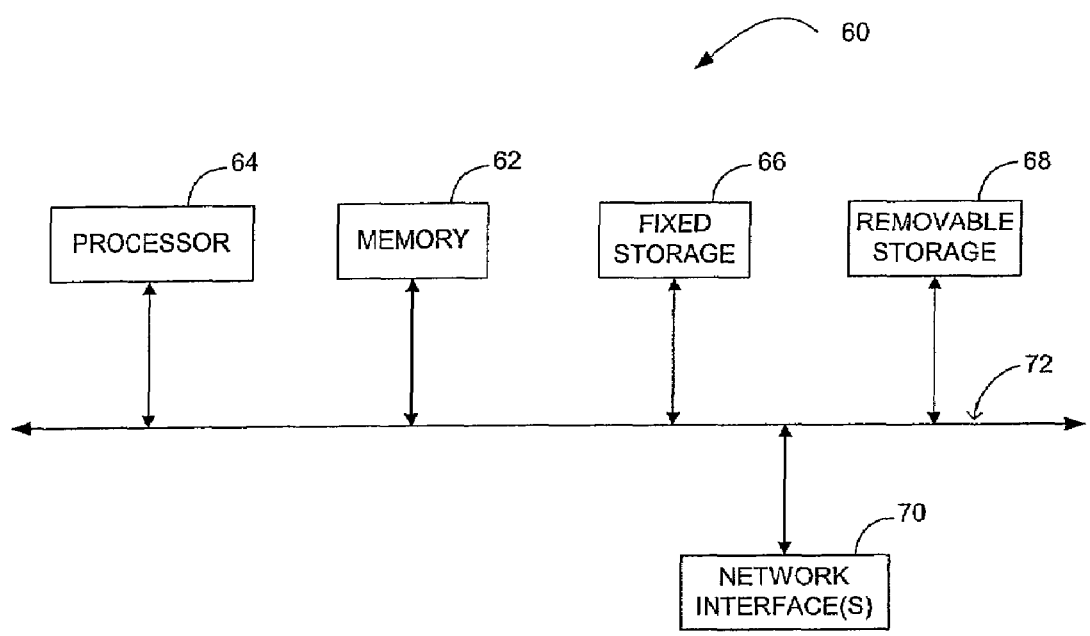
FIG. 7 is a block diagram of a computer system that can be utilized to execute software of an embodiment of the invention.

The computer on which the unsolicited e-mail system is installed may be a stand-along desktop computer, laptop computer, server, mainframe, or a mobile or handheld computing device (e.g., personal digital assistant (PDA) or mobile phone), for example. FIG. 7 shows a system block diagram of computer system 60 that may be used as the user computer, server, or other computer system to execute software of an embodiment of the invention. As shown in FIG. 7, the computer system 60 includes memory 62 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Additionally, a data signal embodied in a carrier wave (e.g., in a network including the Internet) may be the computer readable storage medium. Computer system 60 further includes subsystems such as a central processor 64, fixed storage 66 (e.g., hard drive), removable storage 68 (e.g., CD-ROM drive), and one or more network interfaces 70. Other computer systems suitable for use with the invention may include additional or fewer subsystems. For example, computer system 60 may include more than one processor 64 (i.e., a multi-processor system) or a cache memory. The computer system 60 may also include a display, keyboard, and mouse (not shown) for use as a desktop or laptop computer.

The system bus architecture of computer system 60 is represented by arrows 72 in FIG. 7. However, these arrows are only illustrative of one possible interconnection scheme serving to link the subsystems. For example, a local bus may be utilized to connect the central processor 64 to the system memory 62. Computer system 60 shown in FIG. 7 is only one example of a computer system suitable for use with the invention. Other computer architectures having different configurations of subsystems may also be utilized. Communication between computers within the network is made possible with the use of communication protocols, which govern how computers exchange information over a network, as is well known by those skilled in the art.

Figure 8:
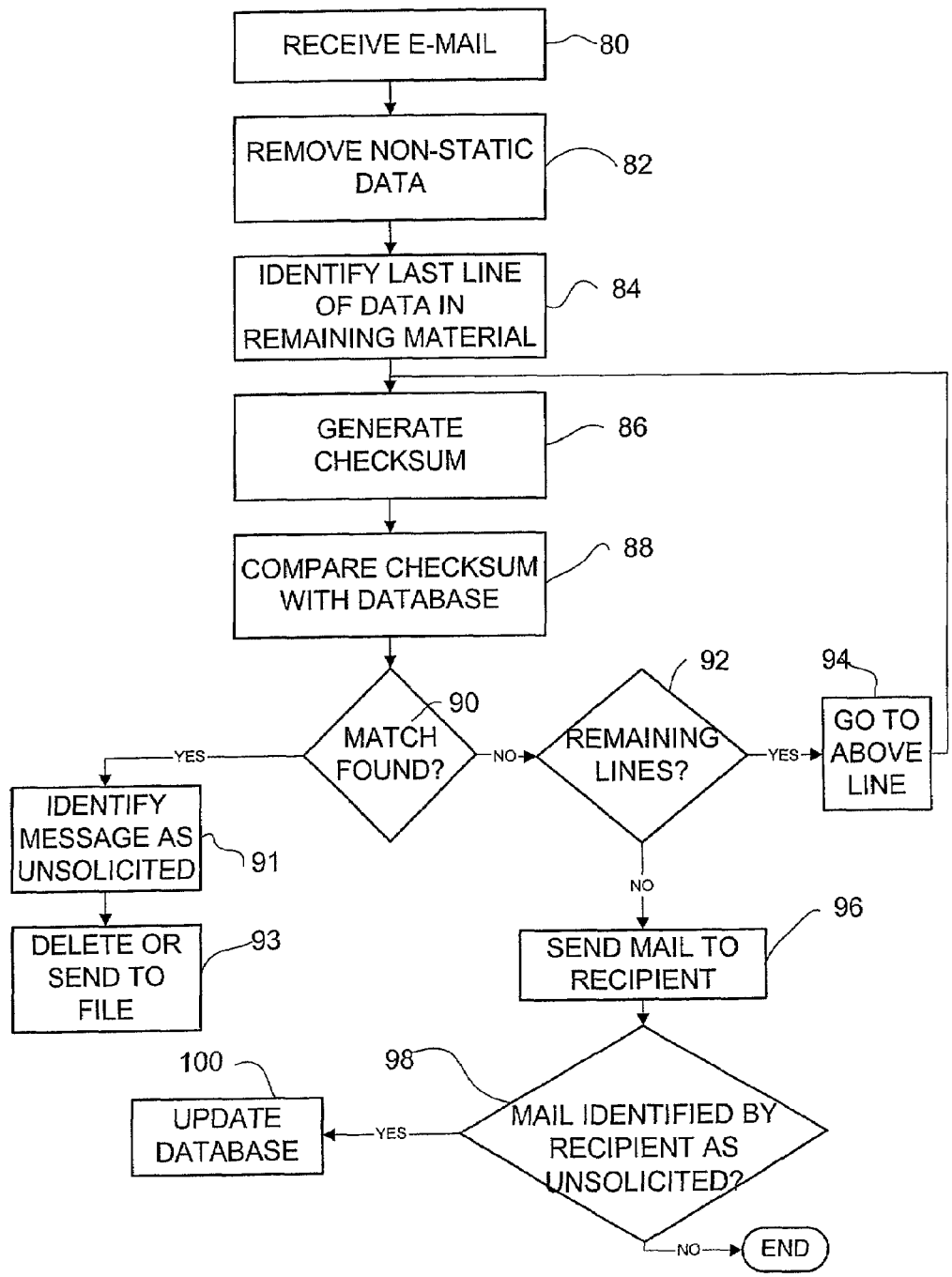
FIG. 8 is a flowchart illustrating a process of the present invention for identifying unsolicited e-mail utilizing checksums.

FIG. 8 is a flowchart illustrating a process of the present invention for identifying unsolicited e-mail utilizing checksums. The e-mail message is received at step 80 and all non-static data is removed from the e-mail at step 82. The last line of the remaining data is then identified (step 84) and a checksum is generated for this data (step 86). The checksum is checked against database 46 to ascertain whether it is a previously identified unsolicited message (step 88). If a match is found, the message is identified as an unsolicited message (steps 90 and 91). The message may then be deleted or placed in a quarantine folder (step 93). If a match is not found, the line above the last line is identified and steps 86, 88, and 90 are repeated. This process continues until a match is found or all lines of the remaining data have been checked (steps 90, 92, and 94). If no matches are found after all the data has been checked, the e-mail is forwarded to the intended recipient (steps 92 and 96). If, upon receipt of the e-mail message, the recipient identifies the e-mail as SPAM, the recipient may add text from this message to the database 46 so that similar messages will be identified in the future (step 98 and 100). It is to be understood that the process may include steps different than described above or the steps may be in a different order, without departing from the scope of the invention. For example, all of the checksums may be generated before comparing the individual checksums with database 46.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for identifying unsolicited electronic mail messages in a computer network, comprising:
    receiving an electronic mail message;
    removing non-static data including visible end-of-line characters and headers, from the electronic mail message;
    generating a checksum based on data remaining within the electronic mail message;
    comparing the generated checksum with a database containing checksums for previously identified unsolicited messages;
    identifying the electronic message as an unsolicited message if the generated checksum matches one of the database checksums; and
    updating the database with new checksums;
    wherein the database is updated based on checksums generated from electronic messages received and identified as an unsolicited message;
    wherein the non-static data is removed to prevent the non-static data from being subject to the checksum, so that non-static data forged by spammers does not compromise the identification of the electronic message as the unsolicited message.

2. The method of claim 1 wherein removing non-static data comprises removing forwarding information.

3. The method of claim 2 wherein the forwarding information includes a ">" character.

4. The method of claim 1 further comprising deleting the electronic mail message if the message is identified as an unsolicited message.

5. The method of claim 1 further comprising at least temporarily storing the electronic message if the message is identified as an unsolicited message.

6. The method of claim 1 further comprising forwarding the electronic message to an intended recipient if the message is not identified as an unsolicited message.

7. The method of claim 1 wherein the non-static data is removed prior to the checksum being generated.

8. A method for identifying unsolicited electronic mail messages in a computer network, comprising:

receiving an electronic mail message;
removing non-static data including visible end-of-line characters and headers, from the electronic mail message;
generating a checksum based on data remaining within the electronic mail message;
comparing the generated checksum with a database containing checksums for previously identified unsolicited messages; and
identifying the electronic message as an unsolicited message if the generated checksum matches one of the database checksums;
wherein the non-static data is removed to prevent the non-static data from being subject to the checksum, so that non-static data forged by spammers does not compromise the identification of the electronic message as the unsolicited message;
wherein generating the checksum comprises generated individual checksums for portions of the remaining data;
wherein comparing the checksum comprises comparing checksums starting with one of the portions at the end of the remaining data and working backwards through the data.

9. The method of claim 8, wherein the portions comprise lines of data.

10. The method of claim 8 wherein the comparing starts with one of the portions at the end of the remaining data and works backward through the data, in order to reduce required processing.

11. A system for identifying unsolicited electronic mail messages in a computer network, comprising:
a message modifier operable to remove non-static data including visible end-of-line characters and headers, from an electronic mail message;
a checksum generator operable to generate a checksum based on data remaining within the electronic mail message;
a database containing checksums previously identified for unsolicited messages; and
a detector operable to compare the generated checksum with the database and identify the electronic message as an unsolicited message if the generated checksum matches one of the database checksums;
wherein the non-static data is removed to prevent the non-static data from being subject to the checksum, so that non-static data forged by spammers does not compromise the identification of the electronic message as the unsolicited message;
wherein the detector is configured to generate individual checksums for portions of the remaining data;
wherein the detector is configured to compare the generated checksums starting with one of the portions at the end of the data and working backwards through the data.

12. The system of claim 11 wherein the portions comprise lines of data.

13. The system of claim 11 wherein the database is configured to receive updates.

14. A computer program product for identifying unsolicited electronic mail messages in a computer network, comprising:
code that receives an electronic mail message;
code that removes non-static data including visible end-of-line characters and headers, from the electronic mail message;
code the generates a checksum based on data remaining within the electronic mail message;
code that compares the generated checksum with a database containing checksums for previously identified unsolicited messages;
code that identifies the electronic message as an unsolicited message if the generated checksum matches one of the database checksums;
code that generates individual checksums for portions of the remaining data;
code that compares the generated checksums starting with one of the portions at the end of the data and works backward through the data; and
a computer readable medium that stores said computer codes;
wherein the non-static data is removed to prevent the non-static data from being subject to the checksum, so that non-static data forged by spammers does not compromise the identification of the electronic message as the unsolicited message.

15. The computer product of claim 14 wherein the computer readable medium is selected from the group consisting of CD-ROM, floppy disk, tape, flash memory, system memory, and hard drive.

* * * * *

UNITED STATES PATENT AND TRADEMARK OFFICE
CERTIFICATE OF CORRECTION

PATENT NO. : 7,257,773 B1
APPLICATION NO. : 10/075722
DATED : August 14, 2007
INVENTOR(S) : Jagger et al.

It is certified that error appears in the above-identified patent and that said Letters Patent is hereby corrected as shown below:

Col. 7, line 18, replace "generated" with -- generating --;
Col. 7, line 29, replace "backward" with -- backwards --;
Col. 8, line 21, replace "the" with -- that --;
Col. 8, line 33, replace "backward" with -- backwards --.

Signed and Sealed this

Twelfth Day of October, 2010

David J. Kappos
*Director of the United States Patent and Trademark Office*